United States Patent
Garofalakis et al.

(10) Patent No.: US 7,797,260 B2
(45) Date of Patent: Sep. 14, 2010

(54) AUTOMATED DOCUMENT CLASSIFIER TUNING INCLUDING TRAINING SET ADAPTIVE TO USER BROWSING BEHAVIOR

(75) Inventors: Minos Garofalakis, San Francisco, CA (US); Jayavel Shanmugasundaram, Santa Clara, CA (US); Erik Nathan Vee, San Jose, CA (US); Rajagopal Baskaran, Santa Clara, CA (US); Jagadish P. Samantarai, Fremont, CA (US); Chyr-Chong (Joseph) Ting, San Jose, CA (US); Yuan Zhuge, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 208 days.

(21) Appl. No.: 12/029,040

(22) Filed: Feb. 11, 2008

(65) Prior Publication Data
US 2009/0204703 A1 Aug. 13, 2009

(51) Int. Cl.
*G06F 15/18* (2006.01)
(52) U.S. Cl. .............. 706/25; 706/45; 706/46
(58) Field of Classification Search .......... 707/5, 707/1, 3; 706/25, 45, 46; 705/14, 7; 345/156
See application file for complete search history.

(56) References Cited

U.S. PATENT DOCUMENTS

| | | | |
|---|---|---|---|
| 7,028,027 B1 | 4/2006 | Zha et al. | |
| 7,146,416 B1 | 12/2006 | Yoo et al. | |
| 2003/0097357 A1* | 5/2003 | Ferrari et al. | 707/3 |
| 2004/0024739 A1* | 2/2004 | Copperman et al. | 707/1 |
| 2007/0018953 A1* | 1/2007 | Kipersztok | 345/156 |
| 2007/0033221 A1* | 2/2007 | Copperman et al. | 707/103 R |
| 2007/0124202 A1* | 5/2007 | Simons | 705/14 |
| 2007/0208730 A1* | 9/2007 | Agichtein et al. | 707/5 |
| 2007/0239642 A1* | 10/2007 | Sindhwani et al. | 706/25 |
| 2007/0271109 A1 | 11/2007 | Wang et al. | |
| 2008/0077580 A1* | 3/2008 | Ozveren et al. | 707/5 |
| 2008/0154668 A1* | 6/2008 | Kuo et al. | 705/7 |
| 2008/0172362 A1* | 7/2008 | Shacham et al. | 707/3 |

* cited by examiner

*Primary Examiner*—Le Luu
(74) *Attorney, Agent, or Firm*—Berkeley Law & Technology Group, LLP (57) ABSTRACT

Subject matter disclosed herein relates to document classification and/or automated document classifier tuning. In an example embodiment, a document received from a user computing platform in an online database stored in a memory of a server computing platform may be classified based, at least in part, on a training set. Also for an example embodiment, the training set may be modified based, at least in part, on statistics gathered from user browsing behavior.

25 Claims, 5 Drawing Sheets

AUTOMATED DOCUMENT CLASSIFIER TUNING INCLUDING TRAINING SET ADAPTIVE TO USER BROWSING BEHAVIOR

FIELD

Subject matter disclosed herein may relate to classifying online documents, and may further relate to automated document classifier tuning.

BACKGROUND

A variety of Web-based applications and/or databases available via the Internet and/or other networks may allow users to browse various documents that may be of interest to particular users. For example, online job search applications and/or databases may allow users to browse documents related to job descriptions and/or other information related to jobs/careers that may be of interest to particular users. In order to provide improved browsing and/or searching experiences for users, documents may be classified in various ways to allow users to zero in on specific documents of interest.

Due to the complexity of the task of classifying documents for online browsing and/or searching, and due to the free-structured form and dynamic nature of web documents and corresponding possible document categories, documents may be misclassified and/or classified under multiple categories without obtaining sufficient confidence in any particular category. As a result, the usefulness of the online documents may be diminished, and the user browsing and/or searching experience may not be fruitful.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, due to the complexity of the task of classifying documents for online browsing and/or searching, and due to the free-structured form and dynamic nature of web documents and corresponding possible document categories, online documents may be misclassified and/or classified under multiple categories without obtaining sufficient confidence in any particular category. As a result, the usefulness of the online documents may be diminished, and the user browsing and/or searching experience may not be fruitful.

As an example, an online database may compile documents related to job/career searching. Documents may include job descriptions, qualifications, locations, etc. As a specific example, a nursing job description document may include terms such as "staff", "manage", "specialist", and "therapy", as examples. This job description may be classified under a number of different categories under a general class of Health Care jobs. Such possible categories may include, for this example, HealthCare.NursingStaff, HealthCare.NursingRegisteredNurse/Specialist, HealthCare.NursingPhysicalTherapist, and HealthCare.Management.

In classifying a document, the choice among the various alternatives, such as, for example, the various HealthCare related alternatives described above, may seem simple to a human expert. A human expert can readily look at things such as job description phrasing, etc., but typical machine-learning tools may not be able to readily distinguish from among the various alternatives, and misclassifications may result.

One approach for dealing with this issue is to use a relatively small number of human experts that may manually inspect "difficult" instances, and hand-label them with the appropriate category (or, potentially suggest refinements to an existing classifier in the case of emerging new categories). These newly-labeled instances may be used to improve classifier accuracy by enhancing the appropriate category definitions in the classifier. Category definitions may include sets of key features extracted for each category, such as, for example, key words, key phrases, etc.

The use of human experts to deal with difficult-to-categorize documents may be a relatively labor intensive, expensive solution, and this solution may introduce delays in obtaining effective and accurate document classification tools. Furthermore, this labor-intensive solution clearly cannot scale to the huge amounts of document information available today and in the future on the Internet.

One possible way to circumvent the need for or to minimize the use of human experts in classifying documents is by observing and exploiting online user browsing behavior. For an embodiment, statistics from the aggregate browsing behavior of a relatively large number of online users may be used to produce indicators for the correctness of one or more categories for a given online document. Also for an embodiment, an automated process may be provided for improving an existing document classifier by automatically learning the correct category or categories for hard-to-classify documents through user browsing-behavior patterns.

Additionally, one or more embodiments may include detecting and/or gathering online browsing patterns of users, wherein the browsing pattern information may allow one or more learning processes to eventually converge on the correct concept for each category, to detect misclassified or poorly classified documents, and/or to refine or re-define existing document categories in an initial classifier as document characteristics and requirements evolve over time.

Figure 1:
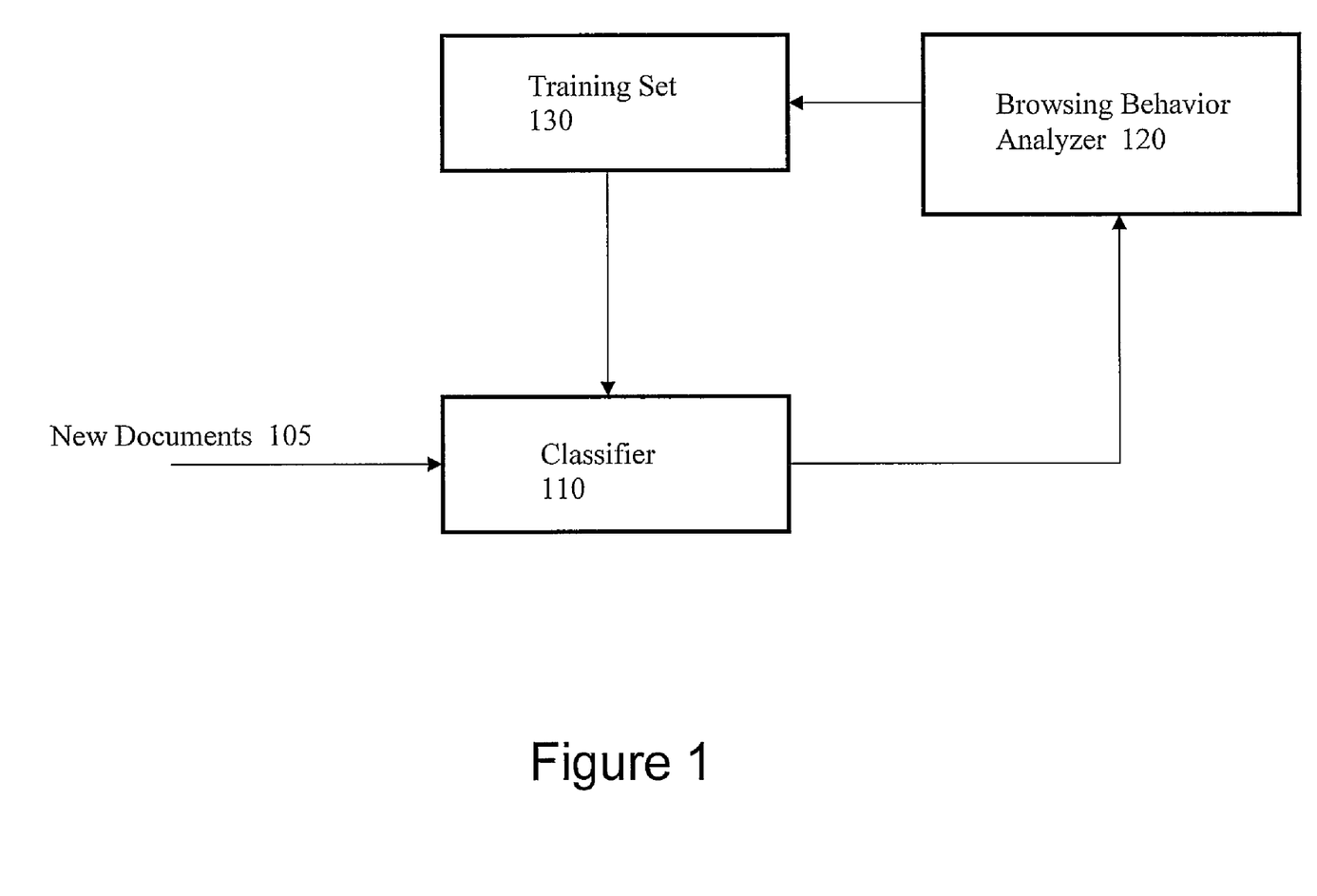
FIG. 1 is a block diagram illustrating an example system and/or process for classifying online documents in accordance with one or more embodiments.

FIG. 1 is a block diagram illustrating an example system and/or process for classifying online documents in accordance with one or more embodiments. Block 110 illustrates a classifier capable of assigning documents, such as new documents 105, to one or more categories. The initial classification may be based on information gleamed gleaned from the document, including, but not limited to, key words and/or phrases. Block 120 illustrates a browsing behavior analyzer capable of gathering browsing statistics for a number of users, perhaps a relatively large number of users for an example embodiment. User behaviors for which statistics may be gathered may include, but are not limited to, clicks (links selected by users), display position for the document in result lists presented to the user, job applications in the case of a job search example such as discussed above, etc.

Block 130 illustrates a training set representing information that may be utilized by classifier 110 in assigning documents to categories. Training set 130 may be modified and/or updated according to statistics determined by browsing behavior analyzer 120. In this manner, training set 130 may be gradually enriched with new examples for different categories once a desired level of confidence is achieved for new incoming documents through the observation of aggregate user browsing behavior. By enhancing the capabilities of training set 130 in this fashion, the system and/or process illustrated in FIG. 1 may increase in accuracy as the underlying category definitions are refined. Example systems and/or processes in accordance with claimed subject matter may include all, more than all, or less than all of blocks 110-130.

As used herein, the term "document" is meant to include any information stored and/or transmitted in a digital format. Example types of documents may include, but are not limited to, text documents, word processing documents, digital images, video files, audio files, portable document files (PDF), etc. Further, an "online" document denotes any document that may be viewed, uploaded, and/or downloaded via any of a wide range of network types, including, for example, the Internet. For one or more embodiments, a plurality of online documents may comprise an online document database. Of course, these are merely examples of online documents and online document databases, and the scope of claimed subject matter is not limited in these respects.

Also, as used herein, the term "training set" denotes any set of information that a classifier may use, at least in part, to assign and/or to learn how to assign a document to one or more categories. Training sets may include, for one or more embodiments, information related to key words and/or phrases and/or other category definition information for various categories.

Figure 2:
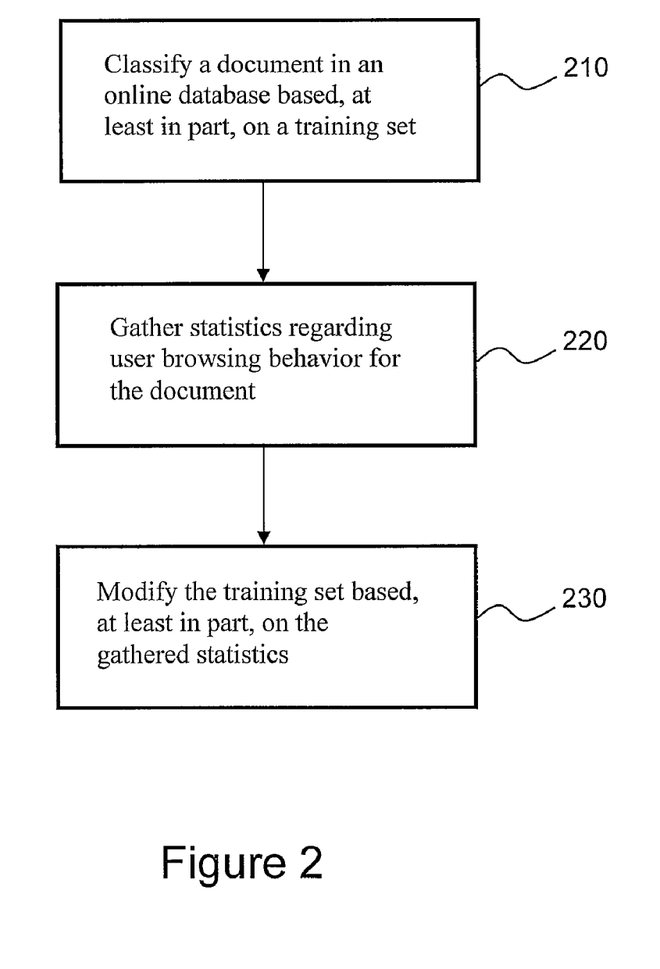
FIG. 2 is a flow diagram illustrating an example process for classifying online documents in accordance with one or more embodiments.

FIG. 2 is a flow diagram illustrating an example process for classifying online documents in accordance with one or more embodiments. At block 210, a document may be classified in an online database based, at least in part, on a classifier built using a training set. As previously described, the training set may include information related to key words and/or phrases and/or other category definition information for a number of categories. For an embodiment, although the scope of claimed subject matter is not limited in this respect, the classification process may comprise assigning to the document a category and a confidence indicator for the category as it relates to the document. At block 220, statistics regarding user browsing behavior may be gathered for the document, wherein the document may be placed under several possible categories for an embodiment. Such statistics may include, for example, clicking patterns or click-through behavior (information regarding links selected by one or more users), although the scope of claimed subject matter is not limited in this respect.

The training set may be modified at block 230. The modification may be based, at least in part, on the gathered statistics for an incoming document, and may include refining category definitions in accordance with the gathered statistics. For an embodiment, the gathered statistics may be compared with statistics of other documents believed to be correctly classified. Further, for an embodiment, the confidence indicator may be updated based, at least in part, on the comparison of the gathered statistics with statistics of other documents believed to be correctly classified. For an embodiment, based on such confidence comparisons using the gathered aggregate statistics, a new incoming document may be added to the training set, and used to re-train and refine the classifier.

For one or more embodiments, the process denoted by blocks 220 and 230 may be repeated for a document a number of times, and additional refinements may be made to training set category definitions as additional user browsing behavior statistics become available and/or as an appropriate level of confidence is achieved for a document classification based at least in part on the user browsing behavior statistics. Also, example systems and/or processes in accordance with claimed subject matter may include all, more than all, or less than all of blocks 210-230.

Continuing with the health care job search example discussed above, a "PhysicalTherapist" job-available document may be misclassified within an online job search database and displayed as a "HealthCare.Management" job opening. As the "PhysicalTherapist" job document is viewed by a number of users, the actions taken by the users in the way of browsing behaviors may deviate significantly from the normal browsing behavior observed for properly classified documents within the HealthCare.Management category. For example, users may tend to close the PhysicalTherapist document relatively quickly after opening the document and/or may select a different link because the users may tend to recognize that the document is not what would be expected in the HealthCare.Management category. As another example, the PhysicalTherapist job document may result in relatively few job application submissions by users due to the misclassification (after all, for this example, the users are likely looking for health care management positions, rather than physical therapist positions). This information may be used to modify a training set used by a classifier to prevent future "PhysicalTherapist" documents from being assigned to the HealthCare.Management category.

In one or more embodiments, for a new document the classifier may assign the document to a number of different categories. This may be done in order to gather user browsing behavior characteristics across various categories, thereby enabling an automated classifier tuning process to tweak a training set and to zero-in on improved category definitions that can accurately accommodate future documents that may share characteristics with the analyzed document. In this manner, the automated classification tuning process may gradually build confidence on correct categories for hard-to-classify documents based, at least in part, on user clicking patterns, and to refine/redefine categories over time.

Figure 3:
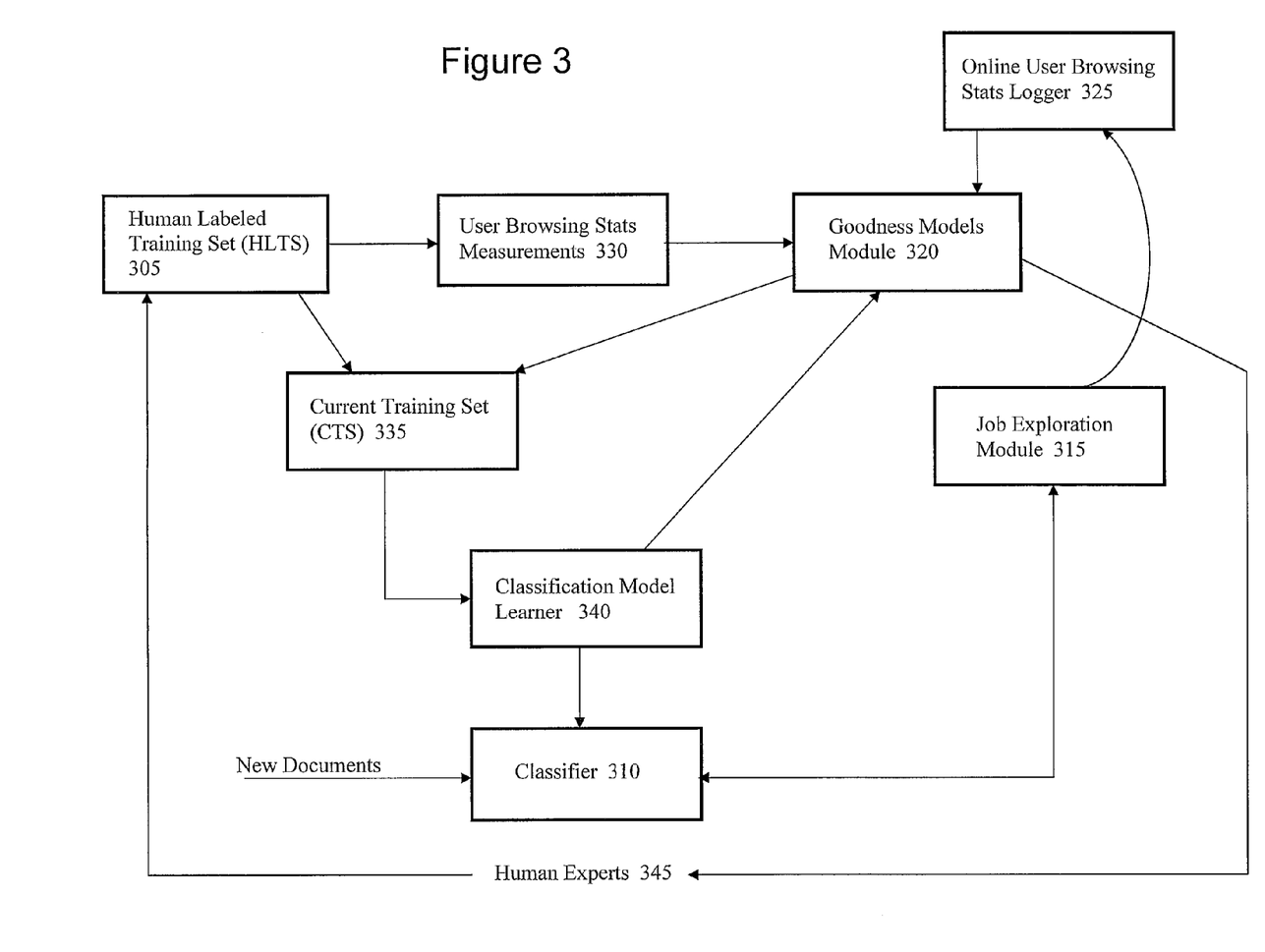
FIG. 3 is a block diagram illustrating an example system and/or process for classifying online documents in accordance with one or more embodiments.

FIG. 3 is a block diagram illustrating an example embodiment of an automated, self-tuning, online document classification process and/or system. Although the process and/or system of FIG. 3 is depicted with specific blocks or modules, these are merely examples of blocks and/or modules that may comprise an automated, self-tuning, online document classification process and/or system, and the scope of claimed subject matter is not limited in these respects. Other embodiments are possible utilizing other combinations of blocks and/or modules.

A classifier 310 may receive a new document, and may assign the document to one or more categories according to category definitions and/or other information provided by a classification model learner 340 and a current training set 335. Current training set 335 may include information derived, at least in part, from a human labeled training set 305. Human labeled training set 305 may be created with significant input from human experts 345 for this example embodiment, although the scope of claimed subject matter is not limited in this respect. Human labeled training set 305 may contain category definition information believed to be accurate due to the human expert's ability to accurately analyze documents to be classified. For this example, human experts 345 may also be utilized on occasion to provide categorization information for very difficult-to-classify documents that have not been successfully categorized via the automated process.

The example automated, self-tuning, online document classification depicted in FIG. 3 may also comprise a goodness models module 320 and a job exploration module 315. Job exploration module 315 may determine which "difficult" job document/potential category combinations to explore. In exploring various combinations, a document may be assigned to a variety of categories. In this manner, users may become exposed to the job document across a range of categories. Additionally or alternatively, various job documents that may or may not be misclassified may be displayed to a user on a results page for a particular category. Statistics may then be gathered relating to the user's browsing behavior for these document/category combinations. Such statistics may be gathered by an online user browsing stats logger 325 for this example.

Goodness models module 320 may, for this example, determine the relevance of a job document to a potential category by comparing that document's logged user browsing statistics with the statistics of other job documents that are known, or believed, to be correctly listed in that potential category. The statistics for the other job documents may be provided by a user browser stats measurements module 330. Information from goodness models module 320 may be provided to current training set 335 in order to refine the training set to improve future document classification accuracy.

For an example, suppose that there are three display positions within a category for a document within the system of FIG. 3. Also, for this example, there may be a number of hand-labeled documents in the system, that is, documents that have been classified by human experts. Because the hand-labeled documents have been classified by human experts, it may be assumed that those documents are correctly categorized. For this example, one of the hand-labeled documents may be labeled (categorized) "Doctor," and may have a click-through rate (CTR) of 0.8, 0.6, 0.4 if displayed at positions 1, 2, and 3, respectively, for category Doctor. These example click-through rates are merely examples, and may represent values measured as user selections (clicks) per a period of time. However, the scope of claimed subject matter is not limited to these specific examples.

Goodness models module 320 may recognize the pattern 0.8, 0.6, 0.4 as a "good" pattern. Therefore, if another document in the system has a CTR pattern of 0.8, 0.6, 0.4 for positions 1, 2, and 3, respectively when displayed in a given category, goodness models module 320 may interpret that other document as being correctly categorized. This makes sense, as the other document is exhibiting similar click-through characteristics as the hand-labeled document, assumed to be correctly categorized. Similarly, if one assumes that a different incoming document (for which no hand-labeling is available) is displayed under the same "Doctor" category and shows a very different CTR pattern than 0.8, 0.6, 0.4 for positions 1, 2, 3—it is quite likely that the document has been misclassified and belongs in a different category.

Taking this example further, negative information of a document not belonging in a certain category may also be utilized in one or more embodiments. For example, suppose that same hand-labeled "Doctor" document has a CTR of 0.4, 0.1, 0.1 if it is displayed under category "Engineer." Goodness models module 320 may utilize this click-through information for this hand-labeled document to recognize improperly categorized documents. Thus, if another document in the system has a CTR pattern similar to that of the wrongly-categorized hand-labeled document, goodness models module 320 may recognize the document as mislabeled.

In addition to using CTR information gathered by using hand-labeled documents, goodness models module 320 may also utilize CTR information gathered through the use of non-hand-labeled document that the classifier has labeled as "high confidence." Essentially, hand-labeled documents (classified by human experts) may be assigned the highest confidence values (the higher the confidence value, the more likely it is that the document is properly classified), but some machine-labeled documents may also be assigned very high confidence values based on the observed aggregate CTR patterns.

Job exploration module 315 for one example embodiment may make decisions regarding the documents for which more information should be collected. For example, suppose that a document (not hand-labeled) is categorized as "Nurse," but that classifier 310 assigns the category a low confidence value (in other words, there is a good possibility that the document is wrongly-categorized). In such a case, job exploration module 315 may decide to display the document more often, and/or in a variety of different categories, in order to be able to gather more user browsing behavior statistics. Goodness models module 320 may use the additional statistics to make determinations on whether or not the document is properly categorized.

For another example, consider a document that if displayed in the "Nurse" category, has CTR of 1, 0, 1 for display positions 1, 2, and 3. If goodness models module 320 unit has seen this pattern before, then the system may determine whether or not the categorization is proper. However, if that CTR pattern is different from any other seen by goodness models module 320, and if classifier 310 has assigned a low confidence value for this document, the system may, for one example embodiment, send that document to a human expert for categorization.

Figure 4:
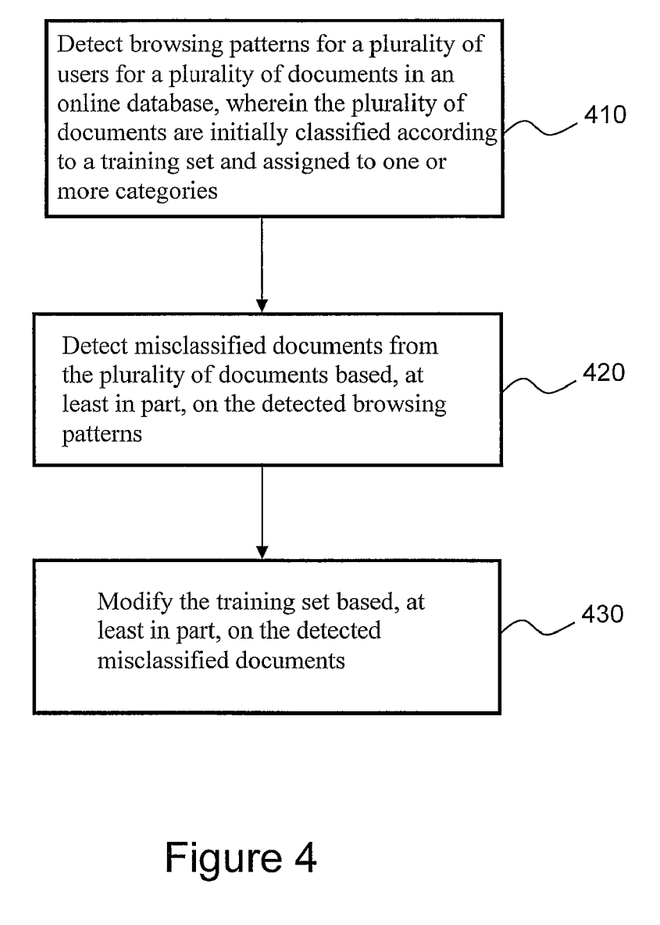
FIG. 4 is a flow diagram illustrating an example process for classifying online documents in accordance with one or more embodiments.

FIG. 4 is a flow diagram illustrating an example process for classifying online documents in accordance with one or more embodiments. At block 410, browsing patterns for a plurality of users for a plurality of documents in an online database may be detected, wherein the plurality of documents are initially classified according to a training set and assigned to one or more categories. At block 420, misclassified documents may be detected from among the plurality of documents based, at least in part, on the detected browsing patterns for the plurality of users. At block 430, the training set may be modified based, at least in part, on information gleaned from the detected misclassified documents. Example processes in accordance with claimed subject matter may include all, more than all, or less than all of blocks 410-430. Further, the order of blocks 410-430 is merely an example order, and the scope of claimed subject matter is not limited in this respect.

Figure 5:
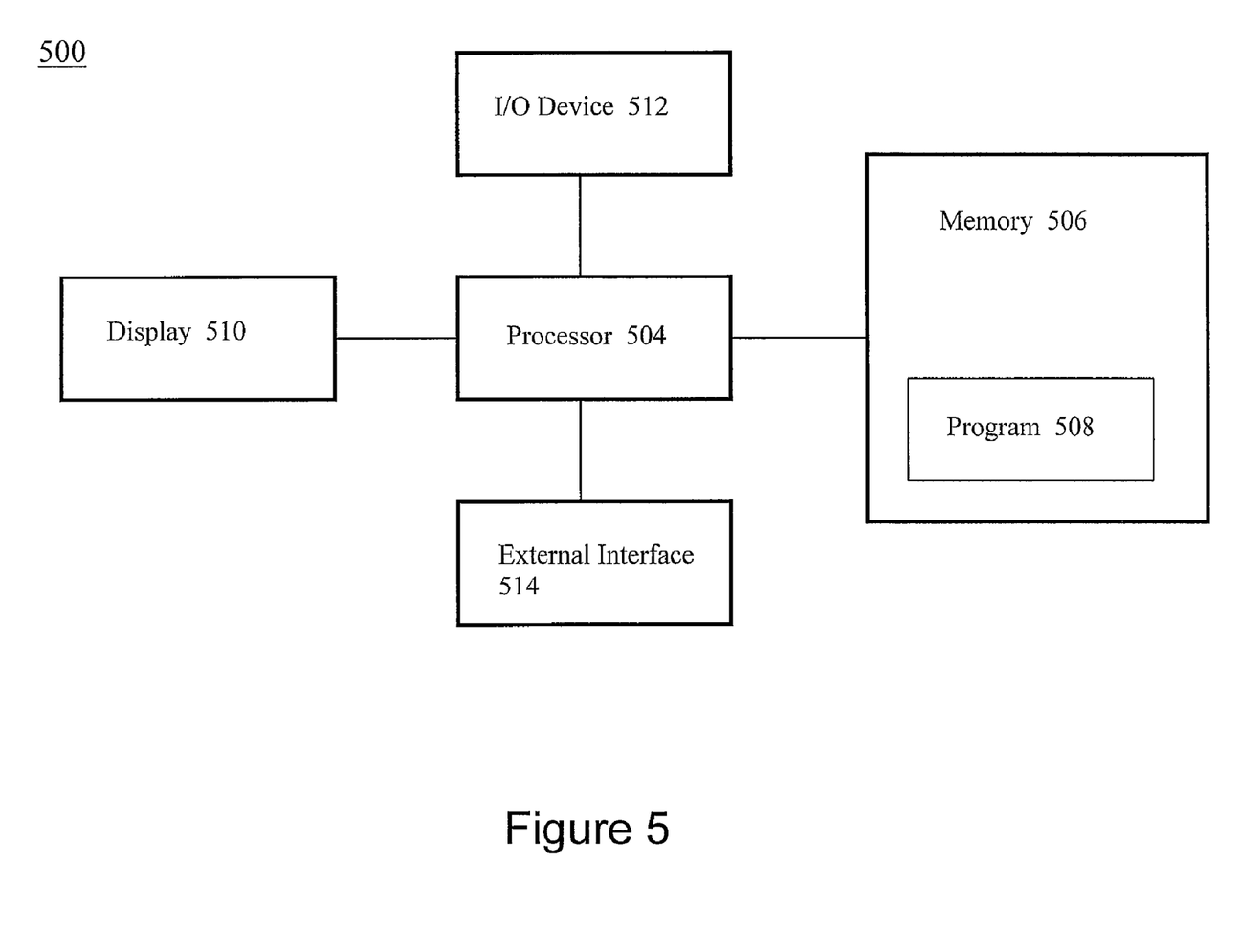
FIG. 5 is a schematic diagram of an example computing platform in accordance with one or more embodiments.

Referring to FIG. 5, a block diagram illustrates a computing platform 500 according to one or more embodiments, although the scope of claimed subject matter is not limited in this respect. Computing platform 500 may include more and/or fewer components than those shown in FIG. 5. However, generally conventional components may not be shown, for example, a battery, a bus, and so on.

Computing platform 500, as shown in FIG. 5 may be utilized to tangibly embody a computer program and/or graphical user interface by providing hardware components on which the computer program and/or graphical user interface may be executed. Computing platform 500 may be utilized to tangibly embody all or a portion of the procedures of FIGS. 1-4, for example. Such a procedure, computer program and/or machine readable instructions may be tangibly stored on a computer and/or machine readable storage medium such as a compact disk (CD), digital versatile disk (DVD), flash memory device, hard disk drive (HDD), and so on. As shown in FIG. 5, computing platform 500 may be controlled by processor 504, including one or more auxiliary processors (not shown). Processor 504 may comprise a central processing unit such as a microprocessor or microcontroller for executing programs, performing data manipulations, and controlling the tasks of computing platform 500. Auxiliary processors may manage input/output, perform floating point mathematical operations, manage digital signals, perform fast execution of signal processing algorithms, operate as a back-end processor and/or a slave-type processor subordinate to processor 504, operate as an additional microprocessor and/or controller for dual and/or multiple processor systems, and/or operate as a coprocessor and/or additional processor. Such auxiliary processors may be discrete processors and/or may be arranged in the same package as processor 504, for example, in a multicore and/or multithreaded processor; however, the scope of claimed subject matter is not limited in these respects.

Communication with processor 504 may be implemented via a bus (not shown) for transferring information among the components of computing platform 500. A bus may include a data channel for facilitating information transfer between storage and other peripheral components of computing platform 500. A bus further may provide a set of signals utilized for communication with processor 504, including, for example, a data bus, an address bus, and/or a control bus. A bus may comprise any bus architecture according to promulgated standards, for example, industry standard architecture (ISA), extended industry standard architecture (EISA), micro channel architecture (MCA), Video Electronics Standards Association local bus (VLB), peripheral component interconnect (PCI) local bus, PCI express (PCIe), hyper transport (HT), standards promulgated by the Institute of Electrical and Electronics Engineers (IEEE) including IEEE 488 general-purpose interface bus (GPIB), IEEE 696/S-100, and so on, although the scope of claimed subject matter is not limited in this respect.

Other components of computing platform 500 may include, for example, memory 506, including one or more auxiliary memories (not shown). Memory 506 may provide storage of instructions and data for one or more programs 508 to be executed by processor 504, such as all or a portion of the procedures of FIGS. 1-4, for example. Memory 506 may be, for example, semiconductor-based memory such as dynamic random access memory (DRAM) and/or static random access memory (SRAM), and/or the like. Other semi-conductor-based memory types may include, for example, synchronous dynamic random access memory (SDRAM), Rambus dynamic random access memory (RDRAM), ferroelectric random access memory (FRAM), and so on. Alternatively or additionally, memory 106 may be, for example, magnetic-based memory, such as a magnetic disc memory, a magnetic tape memory, and/or the like; an optical-based memory, such as a compact disc read write memory, and/or the like; a magneto-optical-based memory, such as a memory formed of ferromagnetic material read by a laser, and/or the like; a phase-change-based memory such as phase change memory (PRAM), and/or the like; a holographic-based memory such as rewritable holographic storage utilizing the photorefractive effect in crystals, and/or the like; and/or a molecular-based memory such as polymer-based memories, and/or the like. Auxiliary memories may be utilized to store instructions and/or data that are to be loaded into memory 506 before execution. Auxiliary memories may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memories also may include any type of non-semiconductor-based memories, including, but not limited to, magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well.

Computing platform 500 further may include a display 510. Display 510 may comprise a video display adapter having components, including, for example, video memory, a buffer, and/or a graphics engine. Such video memory may be, for example, video random access memory (VRAM), synchronous graphics random access memory (SGRAM), windows random access memory (WRAM), and/or the like. Display 510 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth.

Computing platform 500 further may include one or more I/O devices 512. I/O device 512 may comprise one or more I/O devices 512 such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, and/or the like.

Computing platform 500 further may include an external interface 514. External interface 514 may comprise one or more controllers and/or adapters to prove interface functions between multiple I/O devices 512. For example, external interface 514 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices 512.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or as fall within the true spirit of claimed subject matter.

What is claimed is:

1. A method, comprising:
classifying a document in an online database as belonging to one or more of a plurality of categories according to subject matter utilizing, at least in part, a computing platform comprising a processor, wherein the classifying is based, at least in part, on a training set;
gathering statistics regarding user browsing behavior for the document and storing the gathered statistics in a memory of the computing platform;
comparing the gathered statistics with statistics regarding user browsing behavior for other documents interpreted to be correctly classified; and
modifying the training set based, at least in part, on the gathered statistics and based at least in part on said comparison of the gathered statistics with the statistics regarding user browsing behavior for the other documents interpreted to be correctly classified, utilizing, at least in part, the computing platform.

2. The method of claim 1, wherein said gathering statistics regarding user browsing behavior comprises gathering statistics regarding user clicking patterns.

3. The method of claim 1, wherein said gathering statistics regarding user browsing behavior comprises gathering statistics regarding display positions for the document.

4. The method of claim 1, further comprising detecting whether the document has been misclassified based, at least in part, on the user browsing behavior.

5. The method of claim 1, wherein said classifying the document comprises assigning to the document a category and a confidence indicator.

6. The method of claim 5, wherein said comparing the gathered statistics with the statistics regarding user browsing behavior for the other documents interpreted to be correctly classified comprises comparing the gathered statistics for the document with statistics of other documents known to be correctly classified.

7. The method of claim 6, further comprising updating the confidence indicator based on said comparison of the gathered statistics for the document with statistics of other documents interpreted to be correctly classified.

8. The method of claim 7, wherein the documents known to be correctly classified are classified based, at least in part, on a human-labeled training set.

9. The method of claim 1, further comprising classifying the document in a plurality of categories to enable the gathering of additional statistics regarding user browsing behavior for the document.

10. The method of claim 1, further comprising classifying an additional document based, at least in part, on the modified training set.

11. A method, comprising:
detecting browsing patterns for a plurality of users for a plurality of documents in an online database, wherein the plurality of documents are initially classified according to a training set and assigned to one or more categories utilizing, at least in part, a computing platform comprising a processor;
comparing the detected browsing patterns for the plurality of documents with browsing patterns for other documents interpreted to be correctly classified utilizing, at least in part, the computing platform;
detecting misclassified documents from the plurality of documents based, at least in part, on the detected browsing patterns and based, at least in part, on the comparison of the detected browsing patterns with browsing patterns for other documents interpreted to be correctly classified utilizing, at least in part, the computing platform; and
modifying the training set based, at least in part, on the detected misclassified documents utilizing, at least in part, the computing platform.

12. An article, comprising: a storage medium having stored thereon instructions executable by a computing platform to:
classify a document in an online database as belonging to one or more of a plurality of categories according to subject matter, the document to be classified based, at least in part, on a training set;
gather statistics regarding user browsing behavior for the document;
compare the gathered statistics with statistics regarding user browsing behavior for other documents interpreted to be correctly classified; and
modify the training set based, at least in part, on the gathered statistics and based, at least in part, on the comparison of the gathered statistics with the statistics regarding user browsing behavior for the other documents interpreted to be correctly classified.

13. The article of claim 12, wherein the storage medium has stored thereon further instructions executable by the computing platform to gather statistics regarding user browsing behavior at least in part by gathering statistics regarding user clicking patterns.

14. The article of claim 12, wherein the storage medium has stored thereon further instructions executable by the computing platform to detect whether the document has been misclassified based, at least in part, on the user browsing behavior.

15. The article of claim 12, wherein the storage medium has stored thereon further instructions executable by the computing platform to classify the document at least in part by assigning to the document a category and a confidence indicator.

16. The article of claim 15, wherein the storage medium has stored thereon further instructions executable by the computing platform to compare the gathered statistics with the statistics regarding user browsing behavior for the other documents interpreted to be correctly classified at least in part by comparing the gathered statistics for the document with statistics of other documents known to be correctly classified.

17. The article of claim 16, wherein the storage medium has stored thereon further instructions executable by the computing platform to update the confidence indicator based on said comparison of the gathered statistics for the document with statistics of other documents interpreted to be correctly classified.

18. The article of claim 12, wherein the storage medium has stored thereon further instructions executable by the computing platform to classify the document in a plurality of categories to enable the gathering of additional statistics regarding user browsing behavior for the document.

19. An apparatus, comprising:
  means for classifying a document in an online database as belonging to one or more of a plurality of categories according to subject matter utilizing, at least in part, a computing platform comprising a processor, wherein the classifying is based, at least in part, on a training set;
  means for gathering statistics regarding user browsing behavior for the document and means for storing the gathered statistics in a memory of the computing platform;
  means for comparing the gathered statistics with statistics regarding user browsing behavior for other documents interpreted to be correctly classified; and
  means for modifying the training set based, at least in part, on the gathered statistics and based, at least in part, on said comparison of the gathered statistics with the statistics regarding user browsing behavior for the other documents interpreted to be correctly classified, utilizing, at least in part, the computing platform.

20. The apparatus of claim 19, wherein said means for gathering statistics regarding user browsing behavior comprises means for gathering statistics regarding user clicking patterns.

21. The apparatus of claim 20, further comprising means for detecting whether the document has been misclassified based, at least in part, on the user browsing behavior.

22. The apparatus of claim 21, wherein said means for comparing the gathered statistics with the statistics regarding user browsing behavior for the other documents interpreted to be correctly classified comprises means for comparing the gathered statistics for the document with statistics of other documents known to be correctly classified.

23. A computing platform, comprising:
  a memory device; and
  a processor to:
    classify a document in an online database as belonging to one or more of a plurality of categories according to subject matter based, at least in part, on a training set;
    gather statistics regarding user browsing behavior for the document and store the gathered statistics in the memory;
    compare the gathered statistics with statistics regarding user browsing behavior for other documents interpreted to be correctly classified; and
    modify the training set based, at least in part, on the gathered statistics and based, at least in part, on said comparison of the gathered statistics with the statistics regarding user browsing behavior for the other documents interpreted to be correctly classified.

24. The computing platform of claim 23, said computing platform to gather the statistics regarding user browsing behavior at least in part by gathering statistics regarding user clicking patterns.

25. The computing platform of claim 24, said computing platform to detect whether the document has been misclassified based, at least in part, on the user browsing behavior.

* * * * *